United States Patent [19]

Boorse et al.

[11] Patent Number: 5,414,626
[45] Date of Patent: May 9, 1995

[54] APPARATUS AND METHOD FOR CAPTURING, STORING, RETRIEVING, AND DISPLAYING THE IDENTIFICATION AND LOCATION OF MOTOR VEHICLE EMISSION CONTROL SYSTEMS

[75] Inventors: Rodney T. Boorse; Bruce R. Kohn; Kerri R. Shotwell, all of Tucson, Ariz.

[73] Assignee: Envirotest Systems Corp., Tucson, Ariz.

[21] Appl. No.: 63,600

[22] Filed: May 19, 1993

[51] Int. Cl.$^6$ .............................................. G06F 17/30
[52] U.S. Cl. ................................ 364/424.03; 395/153; 395/161; 395/600
[58] Field of Search ...................... 364/424.03, 424.04, 364/550, 551.01, 401, 403; 348/143, 148, 184, 185; 73/116; 395/600, 153, 157, 161

[56] References Cited

U.S. PATENT DOCUMENTS

| | | | |
|---|---|---|---|
| 4,441,359 | 4/1984 | Ezoe | 73/117 |
| 4,796,206 | 1/1989 | Boscove et al. | 364/551.01 |
| 4,899,292 | 2/1990 | Montagna et al. | 364/521 |
| 4,977,524 | 12/1990 | Strege et al. | 364/562 |
| 4,985,848 | 1/1991 | Pfeiffer et al. | 364/518 |
| 5,003,479 | 3/1991 | Kobayashi et al. | 364/424.03 |
| 5,034,893 | 7/1991 | Fisher | 364/431.01 |
| 5,272,769 | 12/1993 | Strnatka et al. | 395/161 |

Primary Examiner—Michael Zanelli
Attorney, Agent, or Firm—Lothrop & West

[57] ABSTRACT

A computer system, including a relational database, especially for use by an inspector at a Motor Vehicle Inspection facility, for capturing, storing, retrieving, and displaying visual images disclosing the identification and location of vehicle Emission Control System (ECS) components. A method for systematically creating, updating, and using the relational database is also disclosed. The database is composed of three data libraries, one for ECS Vehicle Underhood Images, one for ECS Component Overlays, and another for ECS Component Lists. These libraries include visual and factual information regarding the identity and location of ECS required components for a plurality of vehicles. The libraries are maintained and used in the database in such a way as to minimize storage space and maximize the speed of data access and display.

18 Claims, 13 Drawing Sheets

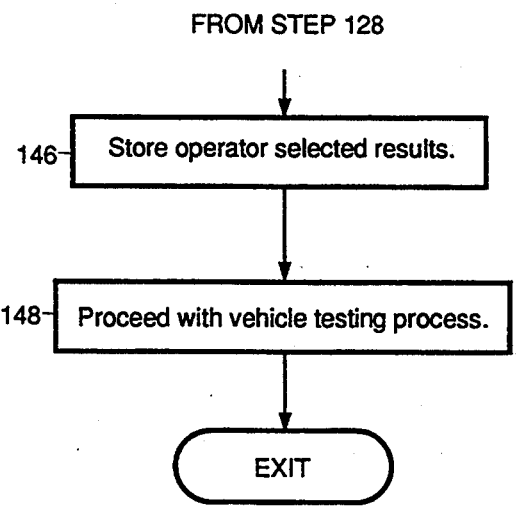
Fig. 5 (e1)
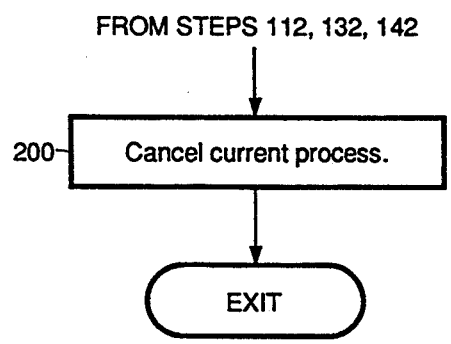
Fig. 5 (e2)
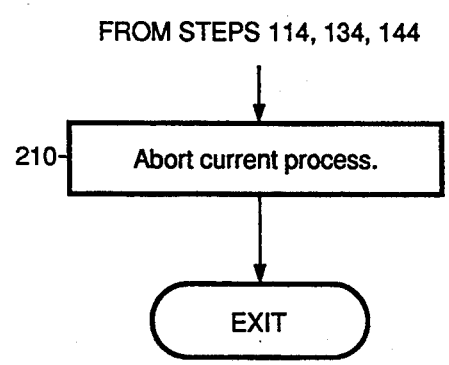
Fig. 5. (e3)

VEHICLE IDENTIFICATION DATA

| | | | | | |
|---|---|---|---|---|---|
| Plate: 111111 | | Registration: 1234568 | | VIN: | 1111111111111111 |
| Year: 1990 | Manufacturer: ISU | | | Type: T | Make: ISU |
| Model: PUPPUP - PUP-REG BED | | | Fuel: G | Standards Fuel: | G |
| Displacement: 2.8 | Cylinders: 6 | Transmission: A | Gears: 4 | Carburetor: F | |

*Fig. 7*

CONFIGURATIONS

| | | | | | |
|---|---|---|---|---|---|
| Plate: 111111 | | Registration: 1234568 | | VIN: | 1111111111111111 |
| Year: 1990 | Manufacturer: ISU | | | Type: T | Make: ISU |
| Model: PUPPUP - PUP-REG BED | | | Fuel: G | Standards Fuel: | G |
| Displacement: 2.8 | Cylinders: 6 | Transmission: A | Gears: 4 | Carburetor: F | |

| Low | High | Manuf | Type | Make | Model | Fuel | Displace | Cylinders | Trans | Gears | Carb | Notes |
|---|---|---|---|---|---|---|---|---|---|---|---|---|
| 1988 | 1991 | ISU | T | | | G | 2.8 | 6 | | | | |

Model: [          ]     MATCHED: 1     FOUND: 4

Vehicle notes: [          ]

[ OK ]  [ No Match ]  [ Expand ]  [ Back ]  [ Cancel ]  [ Abort ]

*Fig. 8*

CONFIGURATIONS

Plate: 111111    Registration: 1234568    VIN: 1111111111111111

Year: 1990    Manufacturer: ISU    Type: T    Make: ISU

Model: PUPPUP - PUP-REG BED    Fuel: G    Standards Fuel: G

Displacement: 2.8    Cylinders: 6    Transmission: A    Gears: 4    Carburetor: F

| Low | High | Manuf | Type | Make | Model | Fuel | Displace | Cylinders | Trans Gears | Carb | Notes |
|---|---|---|---|---|---|---|---|---|---|---|---|
| 1988 | 1991 | ISU | T |  |  | G | 2.8 | 6 |  |  |  |
| 1989 | 1991 | ISU | T |  |  | G | 2.3 | 4 |  |  |  |
| 1989 | 1991 | ISU | T |  |  | G | 2.6 | 4 |  |  |  |
| 1990 | 1991 | ISU | T |  |  | G | 2.3 | 4 |  | 2 |  |

Model: [          ]    MATCHED: 4    FOUND: 4

Vehicle notes: [          ]

[ OK ]  [ No Match ]  [ Expand ]  [ Back ]  [ Cancel ]  [ Abort ]

*Fig. 9*

ECS RESULTS

Plate: 111111    Registration: 1234568    Year: 1990    Cat Type: Three Way

Vehicle Notes: [          ]

| Result | Req | Item - Notes |
|---|---|---|
| Passed | R | FFH - |
| - No Entry |  | PCV - |
| - No Entry |  | TAC - |
| - No Entry |  | EVP - |
| - No Entry |  | EGR - |
| Faulty/Failed | R | TWC - |
| - No Entry |  | AIS - |
| Missing | R | CAP - |
| - No Entry |  | LEAD - |
| - No Entry |  | OC - |

Item Notes: [          ]

[ OK ]  [ Picture ]  [ Back ]  [ Cancel ]  [ Abort ]

*Fig. 10*

APPARATUS AND METHOD FOR CAPTURING, STORING, RETRIEVING, AND DISPLAYING THE IDENTIFICATION AND LOCATION OF MOTOR VEHICLE EMISSION CONTROL SYSTEMS

Field Of The Invention

The invention relates generally to computer systems and methods, adapted to facilitate visual inspections of motor vehicle Emission Control Systems (ECS). More specifically, the invention contemplates a computer-based system for creating and using data bases containing visual and factual information pertaining to a motor vehicle's ECS.

The system generates a video screen representation, including an ECS component overlay, of the underhood engine configuration of a vehicle under test. The ECS overlay identifies and locates the particular ECS elements required by law to be present on the vehicle under test. The visual composite of the engine representation and the overlay assists an inspector in confirming the presence and condition of the ECS components for the vehicle in question.

BACKGROUND OF THE INVENTION

Modern motor vehicles include a number of Emission Control Systems (ECS) components, designed to control and minimize the type and quantity of pollutants allowed to be exhausted by their engines. Typical ECS components include, for example, a Positive Crankcase Ventilation (PCV) unit, an Exhaust Gas Recirculation (EGR) unit, and a Fuel Filler Restrictor (FFR) unit. Periodically, either the state or the federal government requires that such motor vehicles be inspected and tested at an authorized Motor Vehicle Inspection (MVI) facility, to pass or fail the vehicle in accordance with established standards.

The inspection procedure requires the inspector to confirm presence of certain ECS units, which must be present for the particular vehicle under test. The prior art teaches a manual, time-consuming process for determining the presence and location of legally required ECS components for each test. First, an inspector must search a reference manual, or other printed or computer displayed information, for a list of the specific ECS components for the test vehicle. Then, using this list, the inspector makes a visual search of the underhood compartment and the remainder of the vehicle, in an effort to confirm that each component is present.

While some printed reference manuals do have underhood representations, the information is often incomplete as to many of the manufacturer's models, and may be so generic that it is misleading or simply inaccurate for the particular vehicle under test. Thus, the inspector is usually posed with the problem of locating these components on his own, without the aid of a visual reference or key which identifies each component and its underhood location.

Some components are readily apparent to the trained eye, whereas others may be hidden underneath other engine components, or mounted in a remote location, such as under the body or beneath the rear of the vehicle. Still other components may assume a non-conventional appearance, and not be recognized for what they actually are. As a consequence, valuable time is sometimes lost in the process of confirming the location and identification of the required components, or in determining that they have been removed by the vehicle's owner.

The prior art generally shows the use of computers and computer aided displays to test, illustrate, and record data pertaining to motor vehicle performance. For example, in U.S. Pat. No. 4,441,359, issued to Ezoe, a Method And Apparatus For Inspecting Vehicles is disclosed. The design contemplates the use of ROM memory to store particular information regarding the performance characteristics of each "car type". Upper and lower reference values are established for various vehicle inspection items such as wheel alignment, engine characteristics, and exhaust gas. Vehicle age and mileage are also taken into consideration, before a comparison is made between the measured values of vehicle performance and the reference values.

U.S. Pat. No. 5,003,479, granted to Kobayashi et al., teaches a Diagnosis System For A Motor Vehicle, in which a plurality of data representing abbreviations of test check items and corresponding units of measure, are stored in ROM, for specific types of vehicles. The stated object of the invention is to provide a diagnosis system in which diagnosis data is shown directly in a display, rather than having to resort to looking in a manual for interpreting the source and unit of measure for the data.

In Fisher, U.S. Pat. No. 5,034,893, a Graphical Display Of Timing Advance Data is disclosed. By displaying vehicle performance data graphically instead of numerically, the invention is claimed to reduce data interpretation time by reducing the number of fields of view. The use of gray scale, colors, or patterned lines is generally discussed as a means to distinguish between the displayed data.

U.S. Pat. No. 4,796,206, granted to Boscove et al., shows a Computer Assisted Vehicle Service Device, Featuring Signature Analysis And Artificial Intelligence. The device includes a master data base, accessed by each service support system, in which the data provided for fault analysis and diagnosis would constantly be updated in accordance with field results. As part of the main menu procedure, various service and maintenance manuals are shown as available for the vehicle under test; however, no specific reference to graphic displays for particular engine components is indicated.

However, none of the prior art known to the applicants discloses or suggests the apparatus and method for facilitating the inspection of motor vehicle Emission Control Systems taught herein.

SUMMARY OF THE INVENTION

The present invention provides an apparatus and a method, for determining the identification and the location of motor vehicle Emission Control Systems components, for a vehicle under test and inspection at a Motor Vehicle Inspection facility. The general system disclosed herein, includes two subsystems: (1) an Image/Overlay/Data Capture (IODC) subsystem, for capturing and storing visual images and information pertaining to the identity and location of ECS components; and, (2) an Image/Data Presentation (IDP) subsystem, for selectively retrieving and displaying a composite video image of the vehicle underhood image and the ECS component/overlay and certain informational data, stored in the IODC subsystem.

The IODC subsystem typically includes a microprocessor controlled Personal Computer ("PC"), a video camera, hardware to interface the video camera with the PC, and software to facilitate the capture and relational storage of visual images and certain textual/numerical information.

The video images, captured by the video camera and stored in digital form in the computer, represent a collection of pictures showing the vehicle engine compartments, or underhood views, of a plurality of motor vehicle types. The stored computer database is generally referred to as the Vehicle Underhood Image Data Library.

The ECS component overlays, created by and stored in the computer system, include ECS component information, arranged and adapted to be visually superimposed over the vehicle underhood images. These ECS component overlays have location director lines and associated acronyms for ECS components, for a plurality of motor vehicle types. The resultant computer database is known as the ECS Component Overlay Data Library.

The informational data, entered into and stored by the computer system, include ECS component lists, each uniquely associated with vehicle identification characteristics, such as manufacturer, model year, number of engine cylinders, engine displacement, fuel type, and vehicle type. This computer database is generally referred to herein as the ECS Component List Data Library.

Owing to the high detail and resolution necessary to depict a vehicle underhood image, a significant amount of storage space is required to represent all of the possible engine configurations. However, it has been determined that one vehicle underhood image and one ECS component overlay can each represent a plurality of different engine configurations. Therefore, in the present invention, the vehicle Underhood Image and ECS component Overlay Libraries, or tables, are consolidated and relationally grouped by engine configuration, and then separately stored, along with the ECS Component List Library, within an ECS Relational Database.

This database structure includes the feature of storing of the ECS component overlays as discrete elements, separate and apart from the vehicle underhood image. The ability to store and later access for display, separate vehicle underhood images and separate ECS component overlays in different permutations to represent multiple engine configurations, provides significant advantages. For example, relational consolidation of the vehicle underhood images and ECS component overlays minimizes database maintenance and the computer resources necessary to store all the information. Also, reduction in the database size also contributes to faster and more efficient database user access.

The Image/Data Presentation, or IDP subsystem includes a PC-based computer system, the ECS Relational Database composed of the three Libraries, and video image and data presentation software. Typically, the IDP subsystem is located at the Motor Vehicle Inspection facility, and is used and accessed by the inspector, or operator reviewing a vehicle for the presence and the condition of ECS components in test vehicles.

Initially, using the computer keyboard, the inspector enters vehicle identification data based upon apparent vehicle characteristics, such as manufacturer, vehicle year, vehicle type, and engine particulars. Alternatively, this data may be retrieved from an off-site, government maintained vehicle identification database, by typing in the vehicle license plate or the Vehicle Identification Number (VIN).

The microprocessor of the IDP subsystem then uses the entered vehicle identification data to locate and access, all the ECS vehicle configuration records in the ECS relational database which generally match the vehicle identification characteristics. Typically, the IDP subsystem will develop a list or array of possible ECS vehicle configurations, and display them on the video monitor. The inspector then compares the ECS vehicle configurations, with the apparent characteristics of the vehicle under test, before selecting a particular configuration record for further processing.

It is also possible that the IDP subsystem will locate a single, direct match for the vehicle identification characteristics. In this case, only a single corresponding ECS vehicle configuration will be displayed, along with the indication that a direct match has been located.

Once a single vehicle configuration has been selected, either manually by the inspector or automatically by the computer, the IDP subsystem may be called upon to access the ECS Component List Library, and display the ECS component data for the vehicle under test. This provides the inspector with a Results List, calling for an entry for each ECS component listed as a required item for the subject vehicle. If the inspector is readily able to locate and identify each ECS component without further assistance, then an entry is made, the results are stored, and the inspection is completed.

However, the IDP subsystem may also be called upon to provide visual information regarding both the identification and the location of the appropriate ECS components, making reference to a video display of the vehicle underhood image of the selected vehicle configuration.

For this purpose, the IDP subsystem accesses the appropriate records from the Vehicle Underhood Image Library and the ECS Component Overlay Library, and provides a composite video image on the video monitor. The composite video image display shows an vehicle underhood image of the selected vehicle in a high definition black and white picture, overlaid by a colored array of ECS component identifiers. Each of the component identifiers has a respective lead line, which identifies the precise location of the associated ECS component within the vehicle underhood image.

Having the composite vehicle underhood/ECS component overlay video image before him, the inspector can more readily identify and locate the ECS components, and confirm that his inspection and conclusions are accurate. Once the entries are made in the Results List for the required ECS components, the results are stored, and a hard copy with the results of the completed inspection may be printed.

BRIEF DESCRIPTION OF THE DRAWINGS

FIG. 7 shows the vehicle identification data display for a representative vehicle;

FIG. 8 shows an exact vehicle match, automatically determined by the IDP subsystem from the vehicle identification data;

FIG. 9 shows a list of candidate vehicles developed by the IDP subsystem, from the vehicle identification data;

FIG. 10 is an ECS Results Display, showing an ECS component list of items required and the inspection results for each such item, for a representative vehicle under test;

DETAILED DESCRIPTION OF THE PREFERRED EMBODIMENT

The invention disclosed herein provides a computerized apparatus and method, for capturing, storing, retrieving, and displaying visual images and information which disclose the identification and the location of motor vehicle Emission Control Systems (ECS). Making particular reference to FIG. 1, the invention includes an Image/Overlay/Data Capture (IODC) subsystem 1, which results in the generation of an ECS Relational Database 2. The IODC subsystem 1 is effective for capturing and storing, visual images and information relating to the identity and the location of required ECS components, for a plurality of different motor vehicles.

Figure 1:
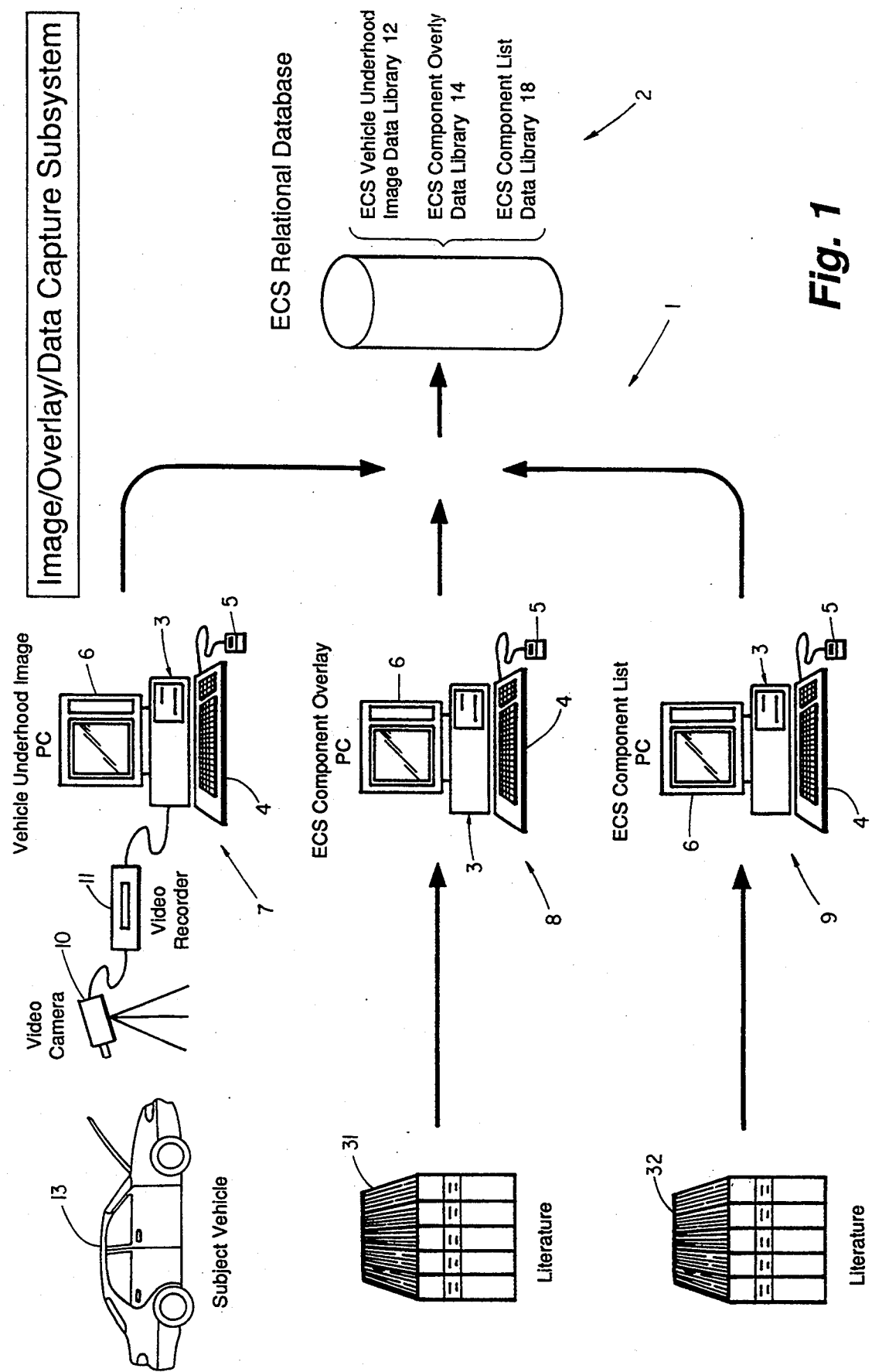
FIG. 1 is a simplified block diagram of the Image/Overlay/Data Capture subsystem, generally showing how the ECS relational database is created.

The IDOC subsystem 1 includes at least one PC-based computer system 3, which has conventional RAM (not shown), hard disc drive (not shown), keyboard 4, mouse 5, and VGA color monitor 6 components. The computer also includes readily available, video image/data capture hardware and software. In FIG. 1, this basic computer system is represented three times, by the Vehicle Underhood Image Personal Computer (PC) 7, the ECS Component Overlay PC 8, and the ECS Component List PC 9. It should be understood that a single computer may be employed to perform the required functions at each workstation, or independent computers may be used in some situations for greater convenience or speed. A printer may also be available at each workstation, to provide hard copy of the stored vehicle underhood images and data, as explained more fully below.

The IODC subsystem 1 also usually includes a high resolution video camera 10 and an associated video tape recorder 11. As a matter of convenience, a camcorder (not shown), having a video camera and a video recorder in a single compact housing, may be used in lieu of the separate components. Ultimately, the electrical signal or video output of the recorder/camcorder is hard wired to the input circuit of the video image capture interface hardware, contained in the Vehicle Underhood Image PC 7. However, this wired connection is usually made indoors, after all vehicle underhood images have been video tape recorded, rather than in the field.

A. Creation Of Vehicle Underhood Image Library

Figure 2:
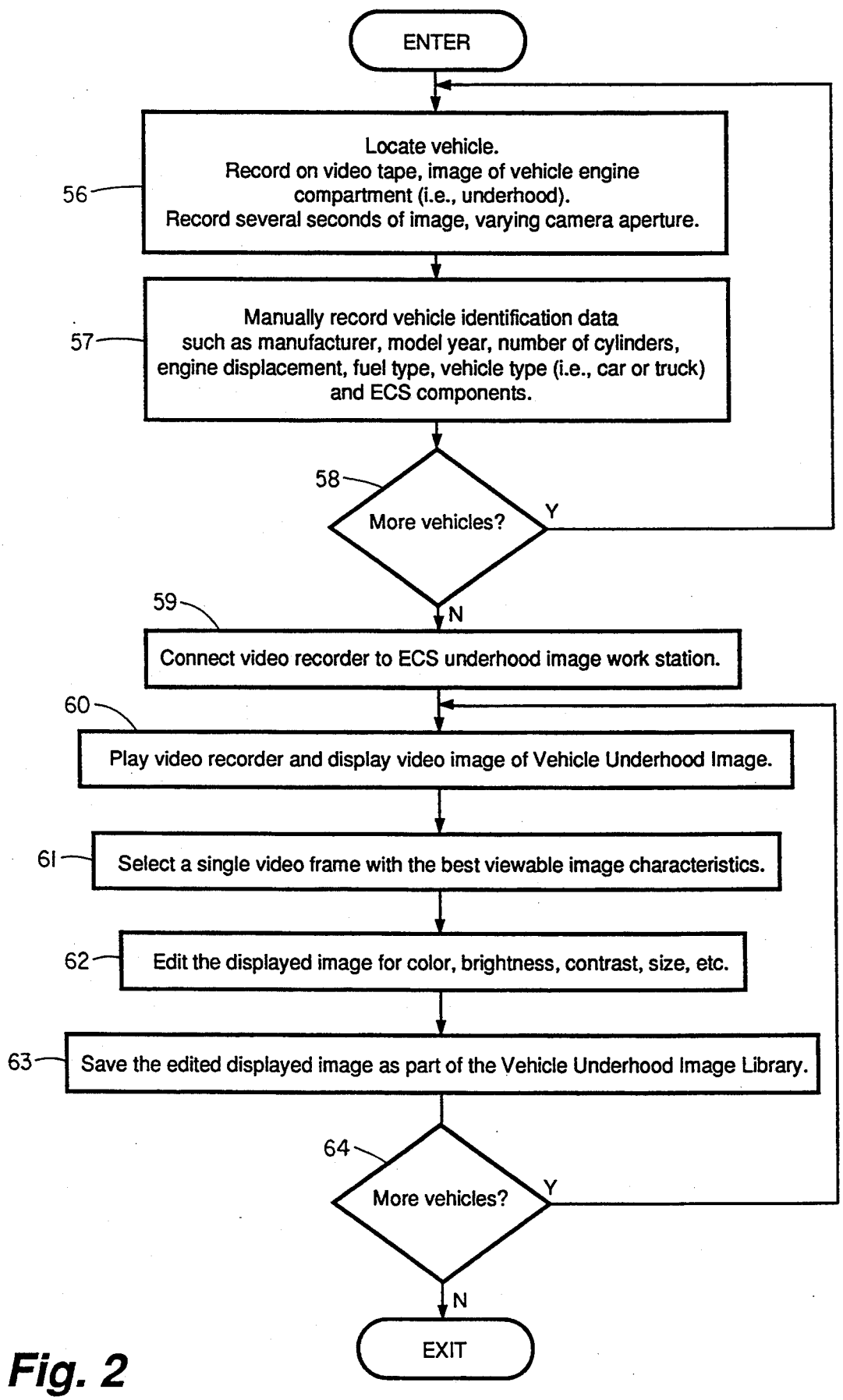
FIG. 2 is a flowchart depicting the technician steps performed during the process of creating the Vehicle Underhood Image Data Library.

FIG. 2 provides a flowchart representation of the sequential and repetitive, capture and storage process preferably used to create the Vehicle Underhood Image Data Library 12. The video camera 10 is located adjacent a subject vehicle 13, having its hood up to expose the engine compartment, including the engine and most of the associated underhood components. The height and direction of the camera are such that a full frame, elevated perspective view of the engine compartment is captured. Using the video recorder, a technician records (see block 56) several short segments of the underhood image, at variable aperture settings of the camera. This ensures that at least one segment will be recorded, having the optimum image detail and an acceptable greyscale balance, between bright and dark areas.

At the same time, a visual or textual record is made (see block 57) of certain vehicle identification data. This may be done by writing such information on a card, and recording it directly on the video tape at the beginning of each series of recordings, or by making a separate handwritten record of such data, which corresponds sequentially to the recording of each vehicle underhood image. This identification data includes such information as vehicle manufacturer, model year, number of engine cylinders, engine cylinder displacement, fuel type, vehicle type, and the noted ECS components.

A plurality of these image records are usually recorded in a session (see block 58), each one corresponding to a particular significant engine configuration. However, as will be explained more fully below, the present invention allows one vehicle underhood image to be used for representing multiple engine configurations, so that a separate image does not necessarily have to be recorded for each configuration. The image records may be recorded over a period of time, and, of course, are updated and corrected as necessary.

Figure 11:
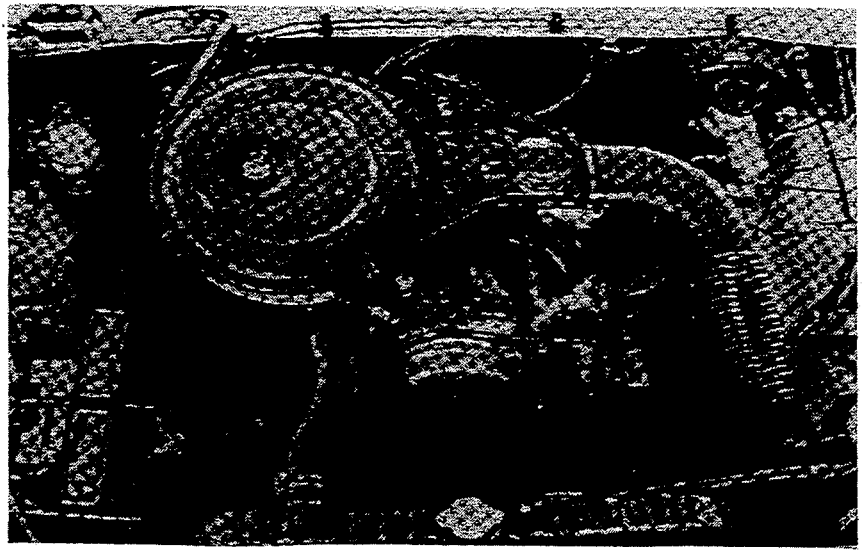
FIG. 11 shows a representative vehicle underhood image.

When convenient, these video tape records are further processed and transformed into digital computer records for storage and later utilization. To that end, either the video tape recorder, or the camcorder, is connected (see block 59) to the Vehicle Underhood Image PC 7, and vehicle underhood images are selectively displayed (see block 60) on the computer's video monitor 6. Viewing the recorded segments for each, the technician selects a single video frame having the best viewable image characteristics, primarily taking into consideration detail and tonal range (see block 61). Then, using the editing features of the computer software, the displayed image is enhanced for optimum color, brightness, contrast, and size, for example (see block 62). A representative underhood, or engine compartment image, after final editing, is shown in FIG. 11.

Finally, the edited visual image is saved and stored as greyscale information in bit-map form (see block 63), as part of the Vehicle Underhood Image Library 12, or Automobile Image Bit-map Record (ABR). See FIGS. 1 and 6. When stored, each underhood image is assigned an image name, which preferably includes abbreviated references to certain vehicle identification characteristics, such as model, year, manufacturer, and engine displacement. The image name is evident in the lower left hand corner of FIG. 11, immediately beneath the stored underhood image. This displaying, selecting, editing, and saving process is repeated for each recorded underhood image, until the Vehicle Underhood Image Library, or ABR, is complete (see block 64).

It should be noted that the underhood image could be captured and stored in a more direct fashion, without the intermediate step of making a video tape recording. For example, the video camera may be directly connected to the computer interface, whereupon a video image could be preliminarily stored, edited, and then finally stored in the ABR.

It should also be noted that alternate means could be used to generate the vehicle underhood image, or a useful equivalent thereof. For example, a electronic, digital still camera and an associated record/playback system (not shown), may be substituted for the described video system. Pictorial vehicle underhood images from a book or other literature could be captured by an optical reader, edited, and then stored as digital information for later display. Also, pictorial vehicle underhood images could be created by the technician on the video monitor, using the mouse or a light pen, providing an appropriate vehicle underhood reference were available. Editing, storage, and display of these created images would proceed in like manner, as for the video images.

B. Creation Of ECS Component Overlay Data Library

Figure 3:
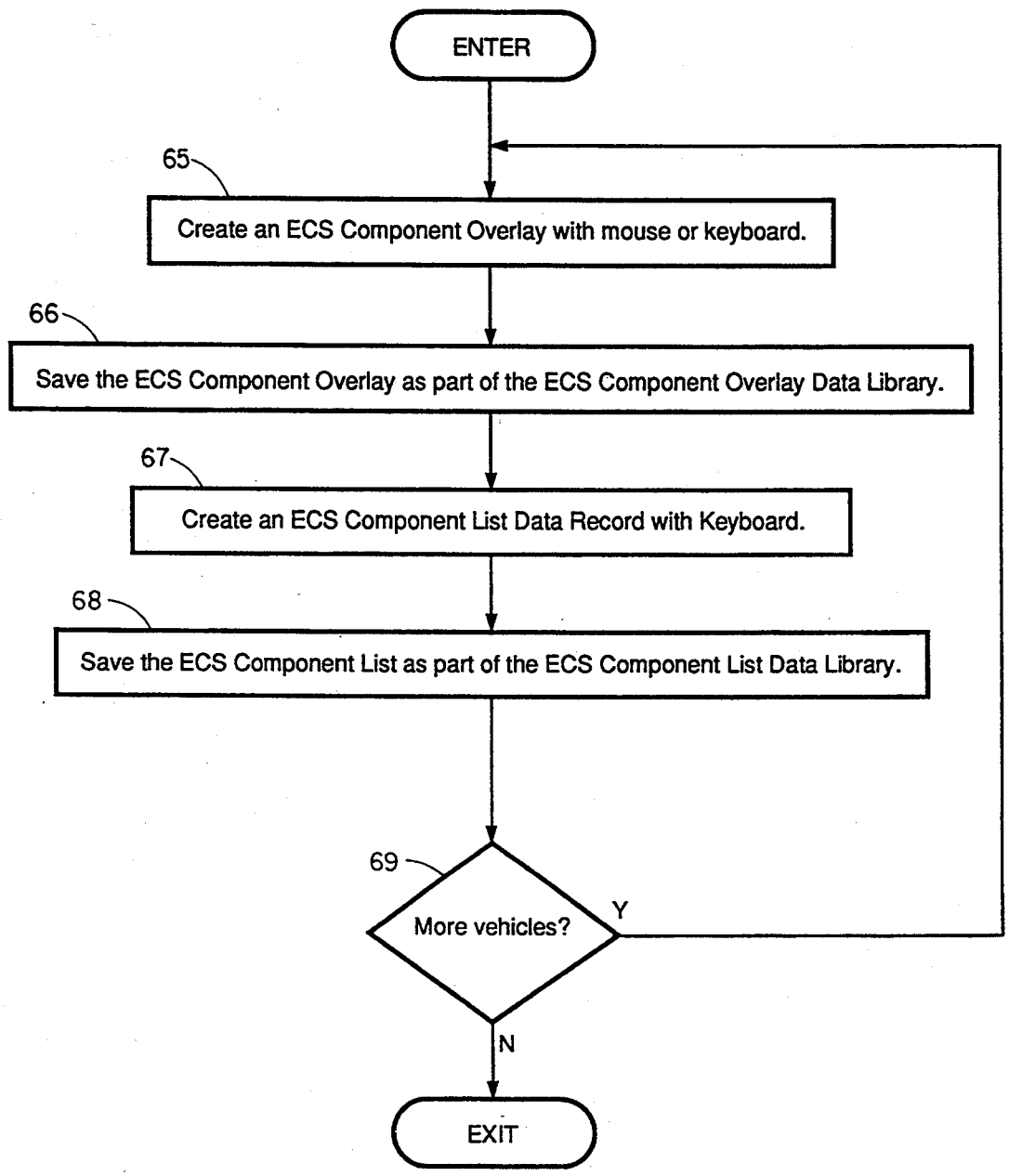
FIG. 3 is a flowchart depicting the technician steps performed during the process of creating the ECS Component Overlay Data Library and the ECS Component List Data Library.
Figure 12:
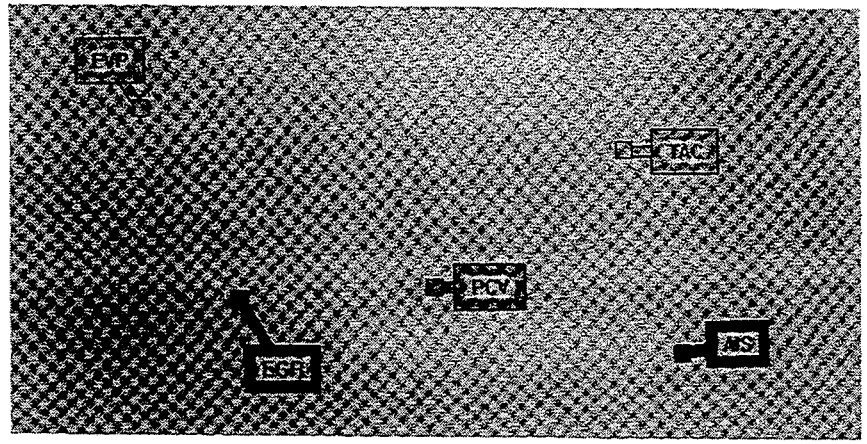
FIG. 12 shows a representative ECS component overlay.

The second step toward completing the ECS Relational Database 2, is the creation of the ECS Component Overlay Data Library 14 (see FIG. 3). Each component overlay identifies and locates the particular ECS components required by law to be present for a specific vehicle engine configuration. A representative example of a component overlay is shown in FIG. 12.

Generally, the graphical overlay includes a plurality of component identifying symbols, preferably rectangular boxes 21, each surrounding a three letter acronym, or item overlay description, for an ECS component. A lead line 22 extends from each box 21, and has a trailing end terminating in a small square 23, or pointer. ECS item description records, previously stored in the Relational Database 2, attribute a particular color to each ECS component. Thus, when the overlay is created, the box, lead line, and square for each ECS component assume the color assigned for that component.

The component overlay is created at the ECS Component Overlay Workstation 8 by first displaying an underhood image, retrieved from the Underhood Image Data Library 12, or ABR. Using the associated vehicle identification data and relying upon available reference literature 31, the technician is able to develop a list of the necessary ECS components for the overlay. Reliance may also be made upon notes and other information gathered when the underhood image was captured. These notes and information give the technician a cross-reference and check, as to the presence and location of ECS components identified on the subject vehicle 13.

By manipulating a mouse or the keyboard, the technician creates and superimposes over the underhood image, the boxes, lead lines, pointers and ECS acronyms required for the overlay (see FIG. 3, block 65). The boxes 21 are located and arranged for maximum clarity with respect to the background image, an appropriate distance from the associated ECS component. The squares, or pointers 23 are located directly over a respective ECS component, and lead lines are generated to connect each box with the appropriate square.

Each ECS component has previously been assigned an item number, an item overlay description, an item description, and a particular color. All of this data is stored within the Automobile Emissions Control Systems Item Description Record 15 (ADR), as bit-map information (see FIG. 6). The item overlay description (e.g., "PCV") is the three letter acronym that is automatically entered into the box 21 when the technician enters the item number in creating the overlay. The item description (e.g., "Positive Crankcase Ventilation" device) is the complete, industry recognized designation for an ECS component. The following is a list, showing the ECS component items and the corresponding acronyms, which are currently valid for use in connection with the present invention:

1) FFR—Fuel Filler Restrictor
2) PCV—Positive Crankcase Ventilation
3) TAC—Thermostatic Air Cleaner
4) EVP—Fuel Evaporative System
5) EGR—Exhaust Gas Recirculation
6) TWC—Three Way Catalytic Converter
7) AIS—Air Injection System
8) CAP—Fuel Cap
9) LEAD—Plumbtesmo Paper Test (lead in tailpipe)
10) OC—Oxidation Catalytic Converter It should be noted that only ECS components 2, 3, 4, 5, and 7, listed above, are located in the engine compartment. Therefore, these are the only ECS components which can appear in the ECS overlay, as the software is currently configured. However, as additional ECS underhood components become required, the system can be updated and expanded to accommodate more components. Furthermore, ECS component items 1, 6, and 8-10, while not appearing on the overlay, are shown in the video display for the more encompassing ECS Component List, discussed in detail below.

Figure 6:
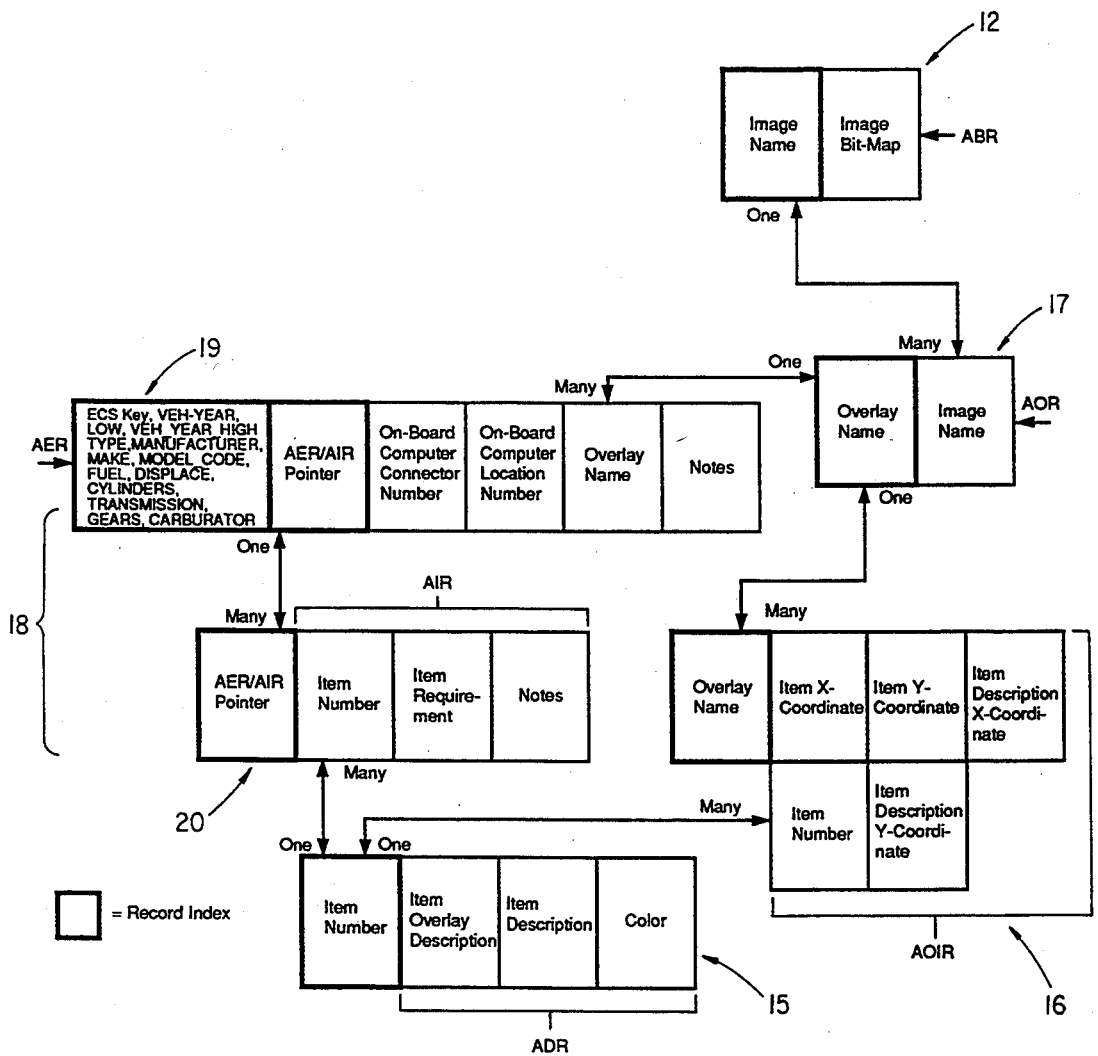
FIG. 6 is a functional block diagram, representing the organization and the relationships among the specific elements of the ECS Relational Database.

As depicted generally in FIG. 3 and more specifically in FIG. 6, once an overlay for an individual ECS component has been created, it is assigned an overlay name and saved (see block 66) within the ECS Component Overlay Data Library 14, as an Automobile Overlay Item Record 16 (AOIR). Making particular reference to the lower left hand corner of the composite image shown in FIG. 13, it will be noted that the overlay name typically includes a vehicle model and a sequentially assigned numerical designation. In addition to the overlay name and the item number, the AOIR 16 includes X and Y graphical coordinates for the location of the ECS item, and the X and Y graphical coordinates for the location of the ECS item description.

At the same time an AOIR is saved, an Automobile Overlay Image Record 17 (AOR) is automatically created and saved within the ECS Component Overlay Library, by the software (see FIG. 6). The AOR 17 includes data pertaining to the overlay name and the image name. The purpose of the AOR 17 is to connect or relate a particular ABR 12 underhood image with particular AOIR 16 overlay images.

The AOIRs are "child" records to an AOR "parent" record. By this it is meant that for every individual ECS component to be displayed in an overlay, a separate AOIR is created. Thus, for a particular AOR there will be as many associated AOIRs as there are ECS components in the overlay. Once all of the AOIRs have been created and saved, separate and apart from the associated underhood image, the technician may proceed with the next step. Alternatively, the technician may elect at this time to create, edit, and save additional overlays, for use with the same underhood image.

C. Creation Of The ECS Component List Data Library

The ECS Component List Data Library 18 (see FIG. 3, block 67) includes ECS configuration data for each unique vehicle engine type, incorporated into the Relational Database. The Component List Data Library includes two classes of related records: Automobile Emissions Configuration Records 19 (AER); and Automobile Emissions Control Systems Item Records 20 (AIR). See FIG. 6. The AER 19 record is a "parent" record to the AIR 20 "child" record in the sense that each AER may have one or more AIR records associated with it. There is an AER/AIR pointer, or numerical designation saved with each AER and AIR record which connects or associates them as parent and child records.

For every unique configuration of vehicle engine, there is an AER 19. The AER includes a record of certain vehicle identification characteristics, which are used to identify the particular vehicle in question. This data, for example, would include the manufacturer, model year(s), number of engine cylinders, engine displacement, fuel type, vehicle type, transmission type, number of gears, and type of carburetion or use of fuel injection. The AER also includes additional vehicle information such as an on-board computer connector number, an on-board computer location number, and notes of interest or explanation regarding variations in ECS configurations for the vehicle engine in question. Lastly, each AER 19 includes an overlay name to access the appropriate image overlay, in a manner discussed more fully below.

For every individual ECS component item associated with a particular engine configuration, an AIR is created. Each AIR 20 contains an ECS component item number, an item requirement indicator (i.e. required or optional for the vehicle in question), and any notes associated with that ECS item. By using the available literature 32 and any notes or other information which has been collected and maintained while creating underhood images, the technician creates the necessary AIRs for the engine configuration. Then, the AER and AIRs for the configuration are saved (see block 68) as part of the ECS Component List Data Library 18, and these steps are repeated for each vehicle to be added to the ECS database (see block 68).

It will be appreciated that storing the ECS component overlay as a separately accessible element, has a number of benefits. It has previously been noted that one vehicle underhood image can be used with a plurality of ECS component overlays to represent a plurality of different engine configurations. Likewise, one ECS component overlay can be used with a plurality of vehicle underhood images to represent a plurality of different engine configurations. Also, if desired, the Relational Database herein can support a one vehicle underhood image, to one ECS component overlay, to one engine configuration data relationship.

The parent/child relationships, between the AOR and AOIR records and the AER and AIR records, provide additional flexibility and maximum utilization of storage space. For example, if an engine configuration does not have a particular ECS component item which is part of an existing overlay, the software will simply not display that ECS component item on the overlay, when the composite image is displayed. Lastly, segregated storage of the ECS component overlay and the vehicle underhood image records, allows independent editing of the presence and location of ECS components without adverse impact upon the vehicle underhood image records.

D. Retrieval And Display Of ECS Configurations

Having discussed the creation and storage of the Relational Database, we will now turn to an explanation of the retrieval and display features of the present invention.

Figure 4:
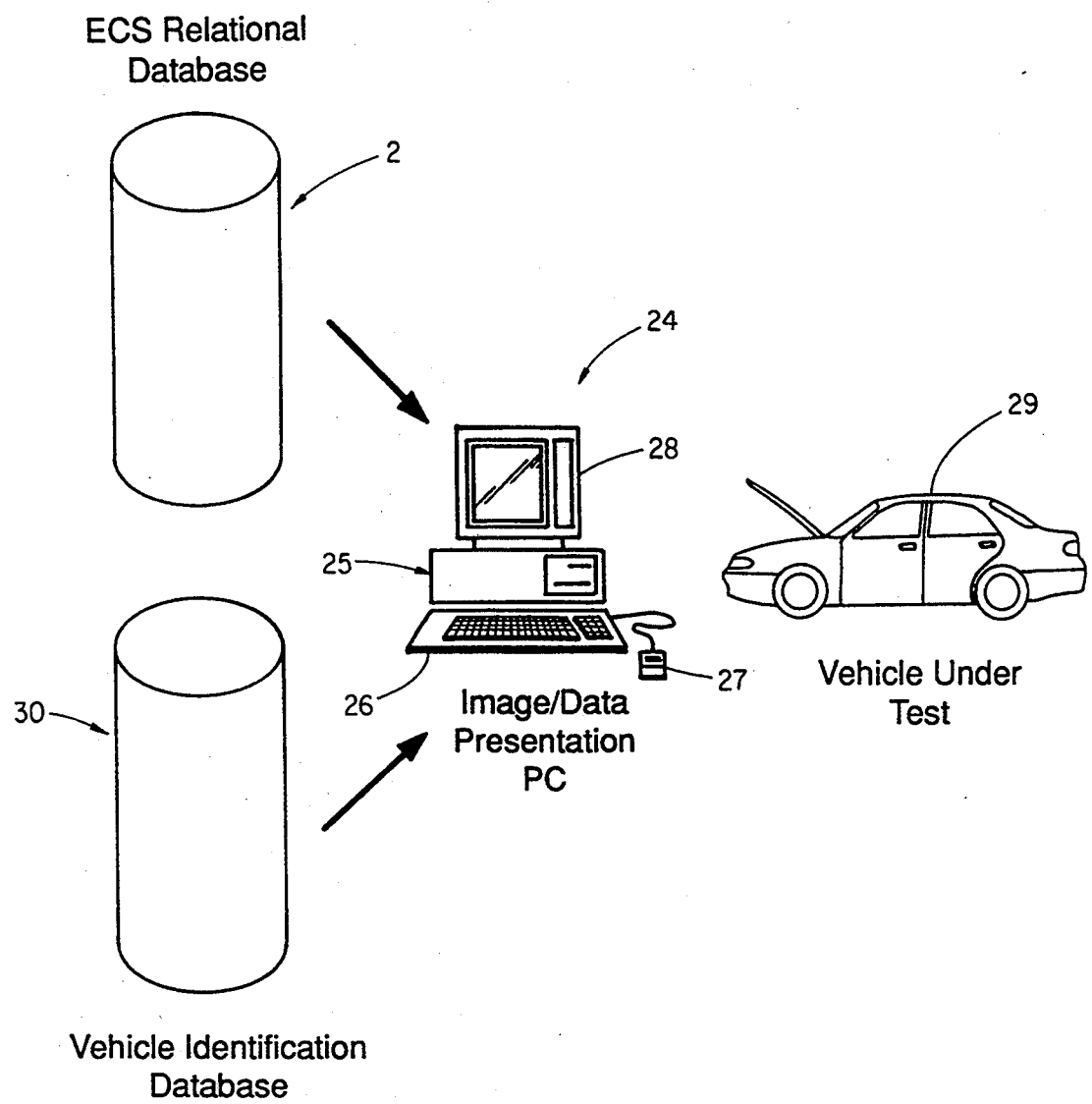
FIG. 4 is a simplified block diagram of the Image/Data Presentation subsystem, including an alternative connection to a separate vehicle identification database.

The Image/Data Presentation (IDP) subsystem 24 is generally shown in FIG. 4, and includes a PC-based computer system 25, having RAM memory, a hard disc drive, a keyboard 26, a mouse 27, and a color monitor 28. The IDP computer system 25 also includes video image/data presentation software, for display of the previously stored vehicle underhood images and ECS information. The IDP subsystem is located at a Motor Vehicle Inspection (MVI) facility, adjacent a vehicle 29 under test. Typically, an inspector at the MVI has a variety of tests to perform on the vehicle, including the examination of the vehicle to confirm the presence and condition of the Emission Control Systems.

The ECS Relational Database 2 is preferably stored on the hard disc of the IDP computer, although other conventional means for providing network access or remote access to the Database 2 may be used as well. The Vehicle Identification Database 30, discussed more fully below, is usually maintained by a governmental agency, so authorized direct or remote access may be gained only by appropriate arrangement.

Familiarity with the content and structure of the computer screen displays used in practicing the process will help in understanding the conceptual explanation of the process to follow. To that end, it should be noted that FIG. 7 is a preliminary screen, used initially by the inspector to enter Vehicle Identification Data regarding the vehicle under test. The six underlined criteria (e.g., year and manufacturer) represent data fields used by the computer to search the previously discussed Automobile Emissions Configuration Records (AERs), to find engine configuration matches.

At the top portion of the "Configurations" displays, shown in both FIGS. 8 and 9, all of the vehicle characteristics previously entered by the inspector and additional vehicle identification data such as license plate, registration number, VIN, make, model code and description, fuel, gears, transmission, and carburetor type are displayed. The additional data is for information only, and is not used by the computer to search Libraries and locate ECS information.

In the middle portion of the "Configurations" displays, a line-by-line listing is made of all the ECS vehicle configurations that are possible candidates for matching the vehicle under test. Each line may contain an entry for: (1) a low year and a high year, displaying a range of vehicle years which the ECS configuration represents; (2) manufacturer; (3) vehicle type; (4) make; (5) model code; (6) type of fuel; (7) engine displacement; (8) number of cylinders; (9) type of transmission; (10) number of gears; (11) carburetor type; and, (12) notes. The operator uses the information associated with each vehicle identified in the list to select an ECS configuration which most closely corresponds to the characteristics of the test vehicle. He does this by using the keyboard cursor to move a line highlight, up and down the list of candidate vehicles.

Near the bottom portion of the "Configurations" displays, additional information, associated with the selected ECS configuration, is displayed. Also indicated near the bottom portion of each such display are the number of ECS configurations FOUND and the number of ECS configurations MATCHED. Note that in FIG. 8, four records were found but only one was matched, whereas in FIG. 9, four records were found and four were matched.

Lastly, the bottom portion of the "Configurations" display includes a horizontal array of function options, explained as follows:
1) OK—Proceed with process using vehicle ECS configuration which is highlighted; p1 2) NO MATCH—Proceed with process using the display of a default ECS configuration. This display is not shown in the drawings herein, but by way of explanation, the default configuration includes ECS items FFR as optional, TWC as optional, CAP as required, and OC as optional;
3) EXPAND—(In FIG. 8 only) Reaccess the ECS Component List Library, and display larger list of retrieved ECS configurations, using only year, manufacturer, and vehicle type, as match criteria; exclude fuel, displacement, and cylinder as match criteria;
4) SELECT—(In FIG. 9 only) Access the ECS Component List Library, and display the retrieved ECS configurations using all of the match criteria;
5) BACK—Return to previous screen display, for the entry of vehicle identification data;
6) CANCEL—Cancel the current process and start over; and,
7) ABORT—Abort the current process in its current state.

Turning now to FIGS. 5(a) through 5(e), the process the inspector uses for presenting and displaying underhood images and ECS information is set forth as a series of even numbered steps. Cross-references to additional and alternative steps are self evident from the drawings. The designations "Y" and "N" are used, respectively, to indicate Yes and No, for the particular decision made or status existing at the juncture blocks.

Figure 5:
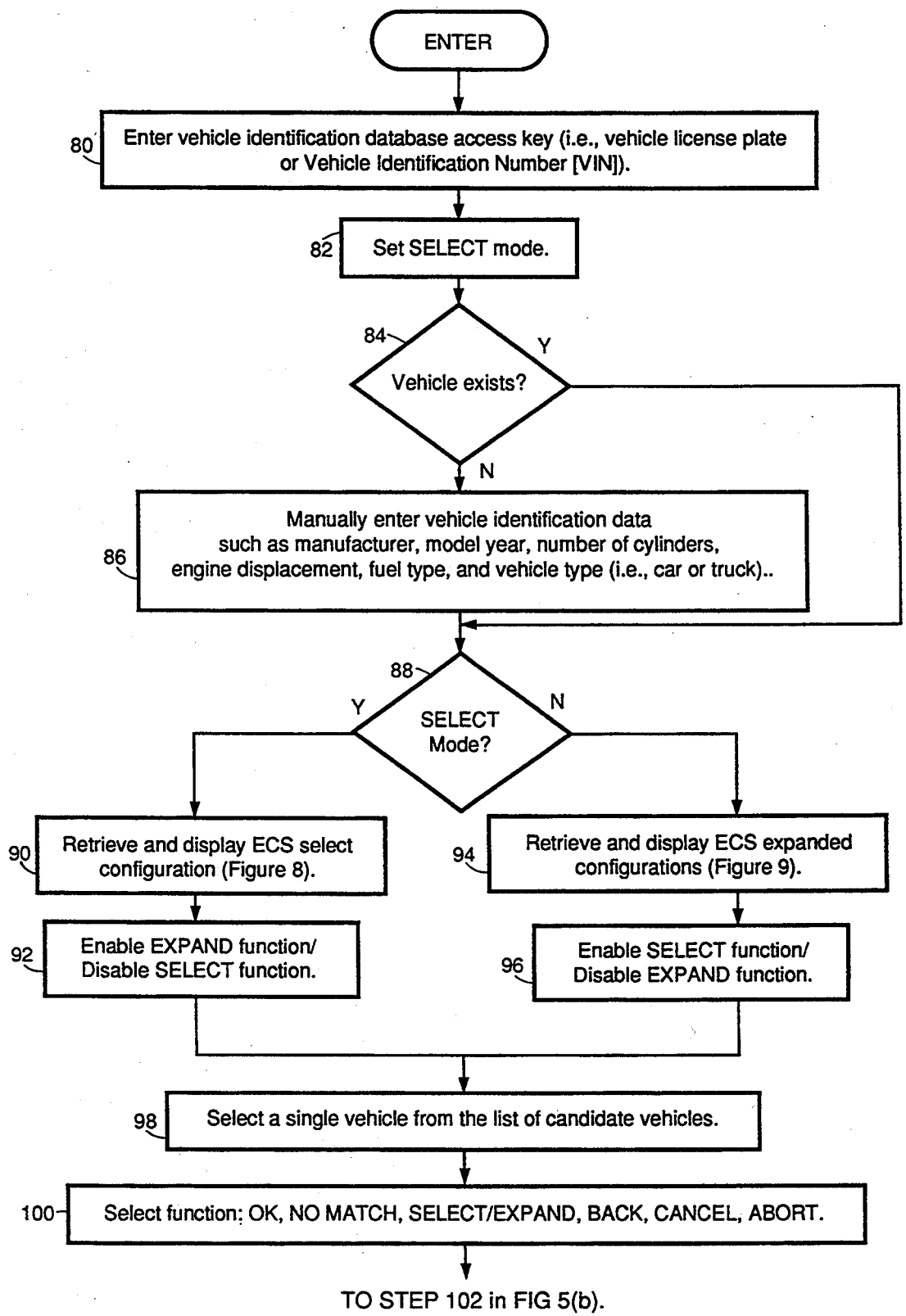
FIGS. 5(a) through 5(e) together represent a flowchart depicting the operator, or inspector steps performed using the IDP subsystem.

Initially, at step 80 of FIG. 5(a), a Vehicle Identification Database access key is entered, providing the IDP subsystem has access to such a Database. Usually, this is done by entering either the vehicle license plate designation, or the Vehicle Identification Number (VIN). The SELECT Mode is then set, as one of the possible operator functions, at step 82. Then, the computer checks the Identification Database to confirm whether or not the vehicle exists. If it does not, then the operator must manually enter the vehicle identification data indicated at step 86, and as shown in FIG. 7.

The example shows that the test vehicle is a 1990 ISUZU pickup, having a regular bed, a 6 cylinder 2.8 liter gas engine, fuel injection, and a four speed automatic transmission. Some, but not all of this vehicle identification data is used by the computer, automatically to locate and display the ECS data that pertains to this engine configuration.

At step 88, assuming that the Select Mode is entered, the computer uses the vehicle identification data to locate and access all the ECS configuration records which match the data. At step 90, the IDP subsystem then displays on the color monitor one of four possibilities: no match; one match and n records found; greater than one match out of n records found; and n matches out of n records found.

By way of example only, FIG. 8 displays a circumstance where a single ECS configuration was matched out of four ECS records found. Whether a single or plural configurations are displayed in this mode will depend upon how many ECS configuration data matches are found in the records. It should be noted that the six underlined criteria of the vehicle identification data all match the data set forth in the single ECS configuration record displayed.

With a match, step 92 can be skipped, and a single vehicle is then selected from the list of candidate vehicles pursuant to step 98. If only a single match is found, the inspector or operator simply proceeds to step 100. If more than one match is present, then a comparison must be made with the test vehicle to confirm the best match.

Returning to step 92, if no match is found, the SELECT function is toggled, and the computer performs a modified retrieve and display function under EXPAND. By re-accessing the AERs and displaying ECS configurations using only the year, manufacturer, and vehicle type fields, a new list of candidates is displayed in carrying out step 94.

FIG. 9 shows an example of the results obtained in the EXPAND function, where a list of four ECS configurations has been developed using the previously entered vehicle identification data. In this case, however, by using fewer fields in searching for a match, three of the four candidates represent four cylinder engine configurations. The EXPAND function is again toggled in step 96, to enable the SELECT function. Then, in step 98, the operator will select from the list the first candidate, having a six cylinder engine, as the correct match for the test vehicle.

Figure 5B:
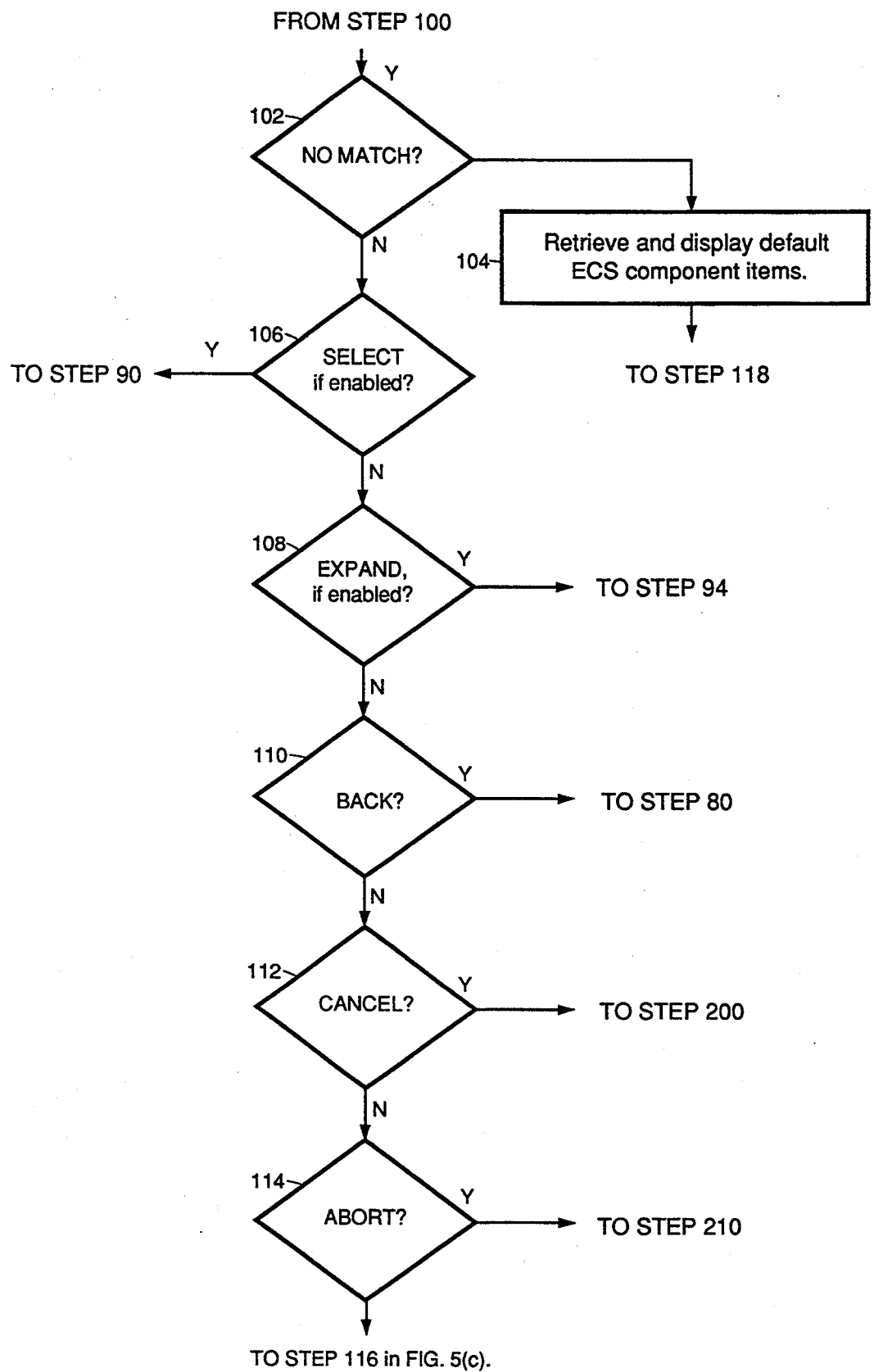
Figure 5C:
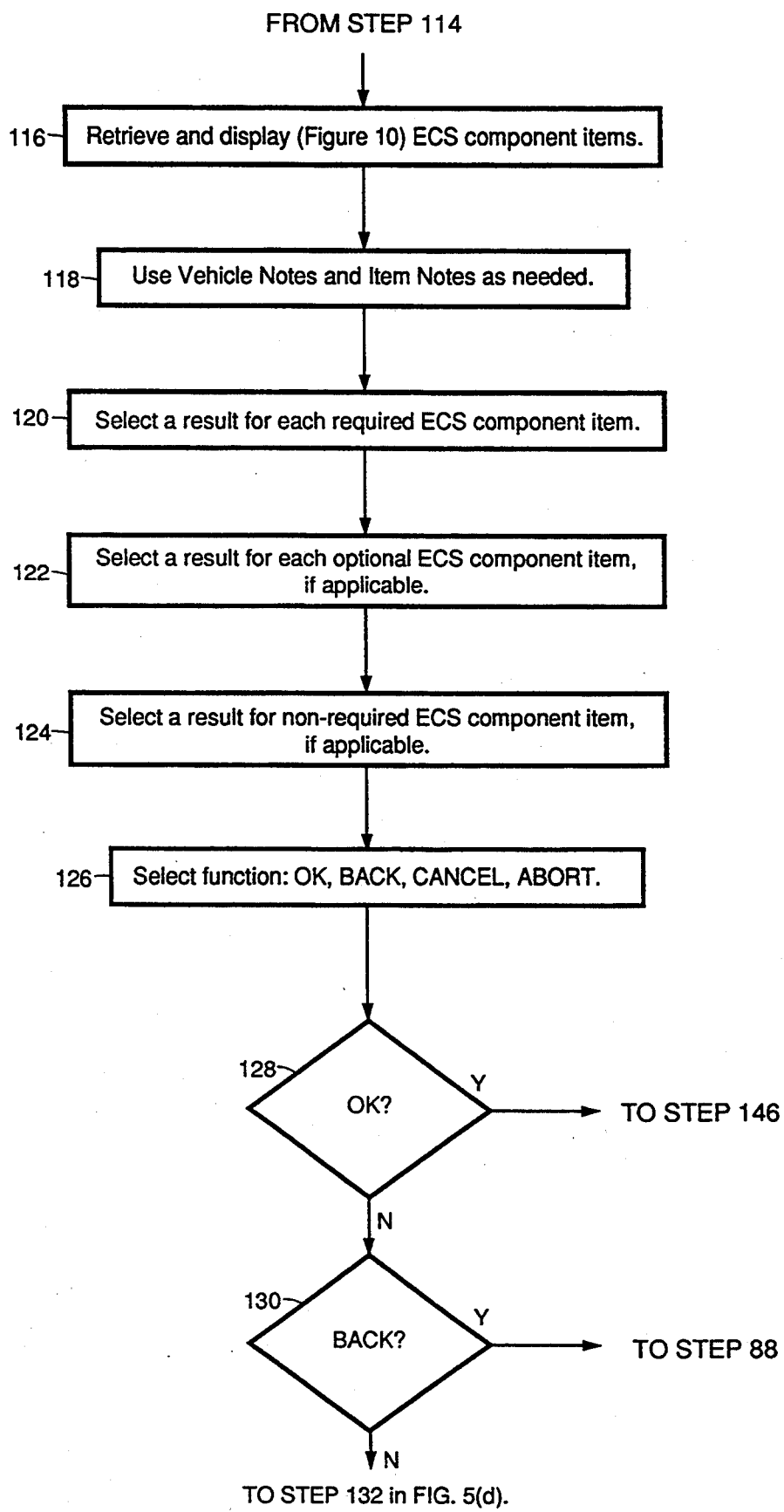
Figure 5D:
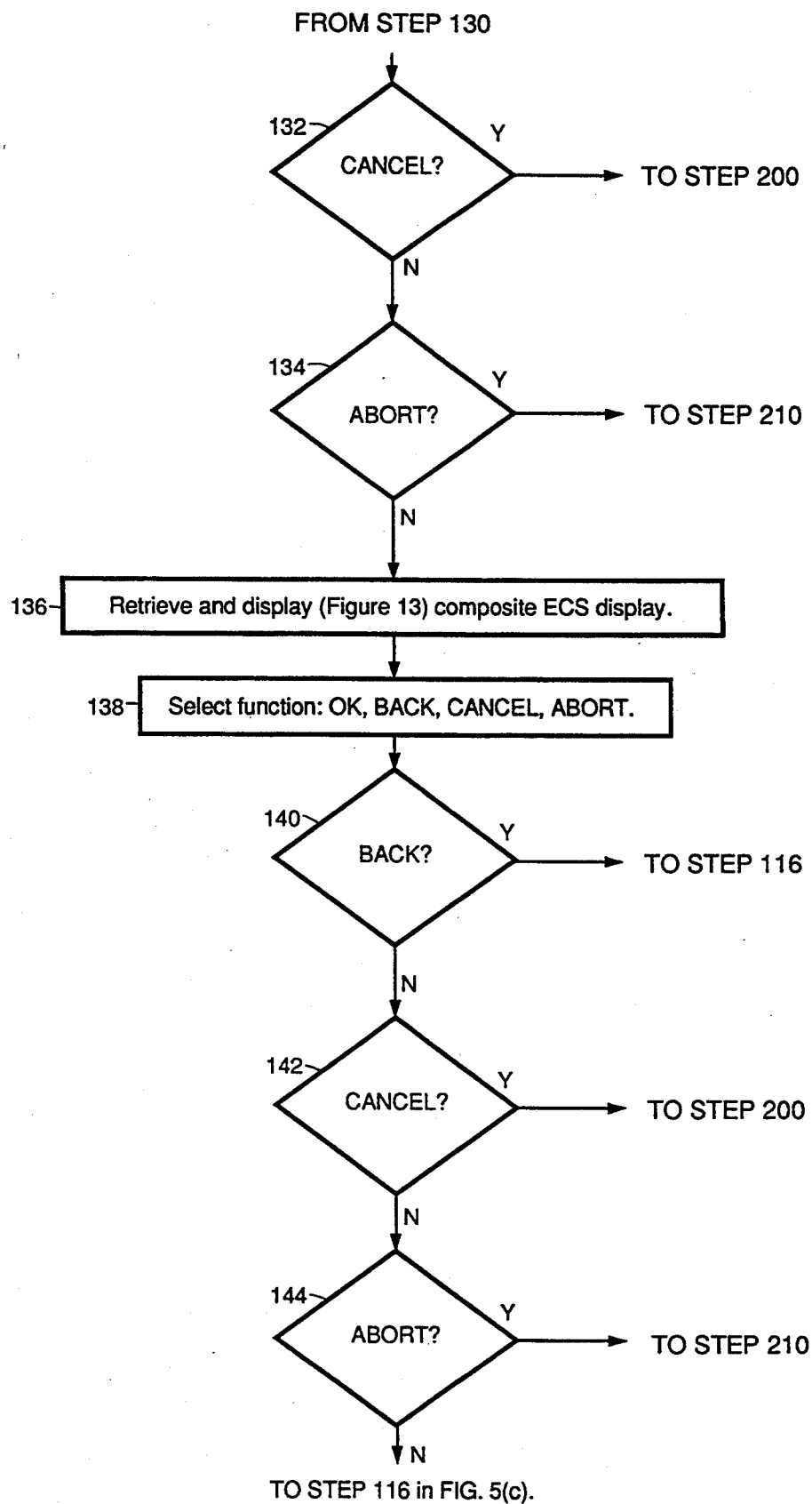

If a match were not found, the process would continue as outlined in FIG. 5(b), until a YES alternate is selected. However, since a match has been found, none of the alternative functions NO MATCH, SELECT, EXPAND, BACK, CANCEL, and ABORT is selected, and the process will fall through to step 116, at the top of FIG. 5(c).

With the operator having selected a single vehicle as a match, the system uses the associated vehicle identification data to access the ECS Component List Data Library, and in particular, the AIR records. For this purpose, the database uses the AER/AIR "pointer" an assigned numerical designation which links a particular AER and all associated AIR records (see FIG. 6). The system then retrieves the ECS component data and screen-displays it, as shown by the example in FIG. 10.

The ECS RESULTS display of FIG. 10, includes the following data entries:
1) Vehicle License Plate
2) Vehicle Registration Number
3) Vehicle Year
4) Catalytic converter type (i.e. Three Way, Oxidadation, or none)
5) Vehicle Notes
6) Result List—For each ECS component, the operator selects a single result or each ECS component which has been identified as a required item. The list of possible results, includes:
 a. No Entry
 b. Passed
 c. Disconnected
 d. Altered
 e. Missing
 f. Faulty/Failed
 g. Obstructed View h. N/A 7) Required Item Field—The letter "R" indicates that the item is required to be present; the letter "0" indicates that the item is Optional; a blank space indicates that the item is not required.

8) ECS Component Item—The acronym which appears on each line corresponds to a particular ECS item, described above. By reading horizontally across each line, it will be evident which ECS components are required for the particular engine configuration, and further the results of the operator's inspection for each component.

9) ECS Component Notes

10) Operator Functions—These functions are identical to most of those previously described, with the exception of the PICTURE function. The PICTURE function will be described in more detail, below.

If the operator has considerable familiarity with the vehicle, including the location and appearance of the ECS components, he may be able to complete his inspection and make all of the required entries into the ECS RESULTS screen without further assistance or reliance upon other reference materials. In this case, the process outlined in steps 118 through 128 will be followed, and with an OK function entry, the results will be stored in step 146, and further testing will be followed with step 148.

Figure 13:
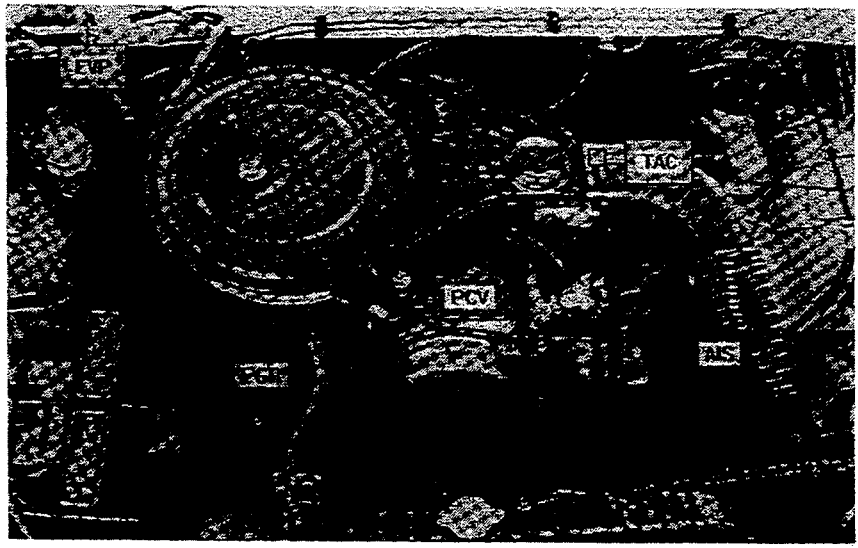
FIG. 13 shows a composite video image, resulting from the combination of FIGS. 11 and 12.

If, however, the operator is unsure or unclear about the presence and location of any required ECS component, he will proceed through to step 136, for retrieving and displaying the composite ECS display (see FIG. 13). To retrieve the composite ECS display, the operator selects the PICTURE function shown in FIG. 10. The appropriate vehicle underhood image (FIG. 11) is accessed from the Vehicle Underhood Image Library, and the appropriate ECS component overlay records (FIG. 12) are accessed from the ECS Component Overlay Library. The system then displays the composite video image of the vehicle underhood image and the ECS component overlay elements, as shown in FIG. 13.

Using the composite video image, the operator is more readily able to identify and locate the required ECS components for the vehicle under test. The Image/Data Presentation subsystem allows the operator to switch back and forth between the ECS RESULTS display and the composite ECS display, so that as components are identified and located, the results can be entered. Once all the ECS component results are entered by the operator, the OK function is selected. The system then stores the results entered by the operator, and the ECS inspection process is complete. The stored ECS results are consolidated with the remainder of the Motor Vehicle Inspection report, and the entire report is then available to be printed in hard form copy.

What is claimed is:

1. An apparatus for capturing and storing visual images and information pertaining to the identity and the location of motor vehicle emission control systems within the underhood engine compartment of a subject motor vehicle, comprising:
    a. a computer system;
    b. means for creating a first computer database, including data corresponding to the visual image of the engine compartment of the subject vehicle;
    c. means for creating a second computer database, including data corresponding to a visual overlay for said visual image of the engine compartment, said visual overlay having the identity and the location of at least one emission control system for the subject vehicle;
    d. means for creating a third computer database, including vehicle identification data and the identity of said emission control system pertaining to the subject vehicle;
    e. means for relationally storing said first, second, and third databases in said computer system, so that by entering the vehicle identification data into an input of said computer system, said computer system will retrieve and output a composite visual image of said visual image of the engine compartment and said visual overlay.

2. An apparatus as in claim 1 wherein said visual image is a video image and in which said means for creating said first database includes a video camera, a video recorder having an input connected to said video camera, and interface means between an output of said recorder and a video data input of said computer system.

3. An apparatus as in claim 1 in which said means for creating said second database includes computer software means for generating both a description of the emission control system and a pointer, corresponding, respectively to the identity and the location of the emission control system within said visual image of the engine compartment for the subject vehicle.

4. An apparatus as in claim 1 in which said computer system includes a video display monitor responsive to said output, said computer system further selectively retrieving and displaying either said composite visual image or the identity of said emission control system for the subject vehicle.

5. An apparatus as in claim 1 in which said second database includes a plurality of visual overlays, each overlay corresponding to a respective emission control system for the subject vehicle, said plurality of visual overlays showing the identity and location of a plurality of respective emission control systems in said composite visual image.

6. An apparatus as in claim 1 in which said first, second, and third databases, respectively, include a plurality of visual images of vehicle engine compartments, a plurality of visual overlays, and a plurality of vehicle identification data and identities of emission control systems, each for a respective one of a plurality of subject vehicles.

7. An apparatus as in claim 1 in which said relational storage means includes a plurality of vehicle identification data records, each one corresponding to a different engine configuration for a plurality of subject vehicles, and in which said computer system retrieves a single visual image of an engine compartment for common use with respective visual overlays of at least two subject vehicles, when outputting the respective composite visual images.

8. An apparatus as in claim 1 in which said relational storage means includes a plurality of vehicle identification data records, each one corresponding to a different engine configuration for a plurality of subject vehicles, and in which said computer system retrieves at least one visual overlay for common use with the visual images of engine compartments of at least two subject vehicles, when displaying the respective composite visual images.

9. A method for capturing and storing visual images and information pertaining to the identity and the location of motor vehicle emission control systems within the underhood engine compartment of a subject vehicle, comprising:
   a. providing a computer system;
   b. creating a first computer database, including data corresponding to the visual image of the engine compartment of the subject vehicle;
   c. creating a second computer database, including data corresponding to a visual overlay for said visual image of the engine compartment, said visual overlay having the identity and the location of at least one emission control system for the subject vehicle;
   d. creating a third computer database, including vehicle identification data and the identity of said emission control system pertaining to the subject vehicle;
   e. relationally storing said first, second, and third databases in said computer system, so that by entering the vehicle identification data into an input of said computer system, said computer system will retrieve and output a composite visual image of said visual image of the engine compartment and said visual overlay.

10. A method as in claim 9 wherein said visual image is a video image and in which said step of creating said first database is carried out using a video camera, a video recorder having an input connected to said video camera, and interface means between an output of said recorder and a video data input of said computer system.

11. A method as in claim 9 in which said step of creating said second database is carried out using computer software means for generating both a description of the emission control system and a pointer, corresponding, respectively, to the identity and the location of the emission control system within said visual image of the engine compartment for the subject vehicle.

12. A method as in claim 9 in which said computer system includes a video display monitor responsive to said output, further including the step of selectively retrieving and displaying either said composite visual image or the identity of said emission control system, for the subject vehicle.

13. A method as in claim 9 in which said second database includes a plurality of visual overlays, each overlay corresponding to a respective emission control system for the subject vehicle, said plurality of visual overlays showing the identity and location of a plurality of respective emission control systems in said composite visual image.

14. A method as in claim 9 in which said first, second, and third databases, respectively, include a plurality of visual images of vehicle engine compartments, a plurality of visual overlays, and a plurality of vehicle identification data and identities of emission control systems, each for a respective one of a plurality of subject vehicles.

15. A method as in claim 9 in which said step of relationally storing said databases includes storing a plurality of vehicle identification data records, each one corresponding to a different engine configuration for a plurality of subject vehicles, and in which said computer system retrieves a single visual image of an engine compartment for common use with respective visual overlays of at least two subject vehicles, when outputting the respective composite visual images.

16. A method as in claim 9 in which said step of relationally storing said first, second, and third databases includes storing a plurality of vehicle identification data, each one corresponding to a different engine configuration for a plurality of subject vehicles, and in which said computer system retrieves at least one visual overlay for common use with the visual images of engine compartments of at least two subject vehicles, when displaying the respective composite visual images.

17. An apparatus for capturing, storing, retrieving, and displaying the identification and the location of motor vehicle emission control systems, for a plurality of subject motor vehicles, each having an engine compartment, comprising:
   a. an image/overlay/data capture subsystem, said subsystem including:
      i. means for creating and storing a plurality of video images in a vehicle underhood image database, each said image showing the engine compartment of a subject motor vehicle and the respective emission control systems located therein;
      ii. means for creating and storing a plurality of video graphic overlays in a component overlay database, each said overlay showing the identity and the location of each emission control system associated with each said subject motor vehicle;
      iii. means for creating and storing a plurality of records in a component list database, each record including respective vehicle identification characteristics and a list of respective emission control system components, required for each subject motor vehicle;
   b. a computerized image/data presentation subsystem, said subsystem having access to said vehicle underhood image database, said component overlay database, and said component list database, said subsystem including:
      i. input means for entering the vehicle identification characteristics of a motor vehicle under test;
      ii. microprocessor means responsive to said input means, for retrieving all data contained in said vehicle underhood image database, said component overlay database, and said component list database, related to the vehicle identification characteristics of the motor vehicle under test; and,
      iii. video display means responsive to said microprocessor means and said input means, for selectively displaying either a composite of said video image and said graphic overlays, or a list of the identities of said required emission control systems, for the motor vehicle under test.

18. A method using a microprocessor controlled computer for capturing, storing, retrieving, and displaying the identification and the location of motor vehicle emission control systems, for a plurality of subject motor vehicles, each having an engine compartment, comprising:
   a. creating and storing a plurality of video images in a vehicle underhood image database, each said image showing the engine compartment of a subject motor vehicle and the respective emission control systems located therein;
   b. creating and storing a plurality of video graphic overlays in a component overlay database, each said overlay showing the identity and the location of each emission control system associated with each said subject motor vehicle;

c. creating and storing a plurality of records in a component list database, each record including respective vehicle identification characteristics and a list of respective emission control system components, required for each subject motor vehicle;

d. entering the vehicle identification characteristics of a motor vehicle under test;

e. retrieving all data contained in said vehicle underhood image database, said component overlay database, and said component list database, related to the vehicle identification characteristics of the motor vehicle under test; and, f. selectively displaying either a composite of said video image and said graphic overlays, or a list of the identities of said required emission control systems, for the motor vehicle under test.

* * * * *